(12) United States Patent
Love

(10) Patent No.: US 6,616,291 B1
(45) Date of Patent: Sep. 9, 2003

(54) UNDERWATER LIGHTING ASSEMBLY

(75) Inventor: David A. Love, Elliot Lake (CA)

(73) Assignee: Rosstech Signals, Inc., Elliot Lake (CA)

(*) Notice: Subject to any disclaimer, the term of this patent is extended or adjusted under 35 U.S.C. 154(b) by 0 days.

(21) Appl. No.: 09/748,742

(22) Filed: Dec. 20, 2000

Related U.S. Application Data

(60) Provisional application No. 60/220,965, filed on Jul. 26, 2000, and provisional application No. 60/171,891, filed on Dec. 23, 1999.

(51) Int. Cl.[7] ............................................. F21V 33/00
(52) U.S. Cl. ...................... 362/101; 362/231; 362/240; 362/267; 315/185 R; 315/193
(58) Field of Search .............................. 362/101, 545, 362/800, 254, 240, 231, 267, 362; 315/185 R, 189, 193

(56) References Cited

U.S. PATENT DOCUMENTS

| | | | | | |
|---|---|---|---|---|---|
| 5,633,629 | A | * | 5/1997 | Hochstein | .................... 340/907 |
| 6,016,038 | A | * | 1/2000 | Mueller et al. | .............. 315/291 |
| 6,150,774 | A | | 11/2000 | Mueller et al. | .............. 315/291 |
| 6,166,496 | A | * | 12/2000 | Lys et al. | .................... 315/316 |
| 6,184,628 | B1 | * | 2/2001 | Ruthenberg | ................. 315/185 |
| 6,435,691 | B1 | * | 8/2002 | Macey et al. | ................ 362/101 |

* cited by examiner

*Primary Examiner*—Sandra O'Shea
*Assistant Examiner*—Ali Alavi
(74) *Attorney, Agent, or Firm*—Harness, Dickey & Pierce, P.L.C.

(57) ABSTRACT

The present invention provides an under water lighting assembly including a housing and a plurality of LEDs mounted on a board within the housing. The LEDs are arranged in a plurality of banks such that are powered respectively. The banks are circular and concentric. A non-board programmable process or allows independent color switching and color modulation of the LED arrays.

20 Claims, 9 Drawing Sheets

UNDERWATER LIGHTING ASSEMBLY

CROSS REFERENCE TO RELATED APPLICATION

This invention relates to U.S. Provisional Application No. 60/171,891, filed Dec. 23, 1999 and U.S. Provisional Application No. 60/220,965, filed Jul. 26, 2000.

BACKGROUND OF THE INVENTION

1. Technical Field

The present invention generally pertains to a lighting assembly. In particular, the present invention pertains to an underwater lighting assembly. More specifically, but without restriction to the particular embodiment and/or use which is shown and described for purposes of illustration, the present invention relates to an underwater lighting assembly which incorporates a plurality of LEDs.

2. Discussion

The common method for underwater lighting applications such as spas and hot tubs uses 12-volt incandescent light bulbs encased in molded plastic water-sealed housings. The housings are mounted below the spa water level. This provides an attractive colored glow to the tubs when in operation. It also provides an added safety measure on tub entry and exit. For mood lighting, manufacturers include snap-on lenses in red and blue tints to alter the appearance and effect of the spa lighting.

Conventional spa lighting applications such as that described above are associated with specific disadvantages. In this regard, there are some problems with reliability of this system. The incandescent bulbs frequently fail during the typical 3-year warrantee period of the tubs. The failure of the 12-volt incandescent light bulbs is due to a couple of factors. These small bulbs are commonly rated for about 1000hours of operational life. If the lights are in use for only two to three hours per day, the bulb would typically need replacement yearly as a regular spa maintenance procedure. Once initially lighted, the bulb filament is very fragile due to the high temperatures obtained during operation. Even slight jarring or knocking on the bulb housing can dislodge or break the filament, requiring replacement. Also, since incandescent bulbs convert most of their energy to heat, as little as 10% to light, the ambient temperature inside the plastic housing is considerably higher than the 40 degree C. spa temperature, further reducing the durability of the bulb.

There are two typical options in molded style housings which allow for bulb replacement. The bulb can be accessed from the rear of the housing on the exterior of the spa, which requires service access consideration and a removable section of insulation to provide housing access. This is currently the most common option, though it adds expense for accessibility and reduces the insulation effectiveness, resulting in increased energy consumption. The second option uses a somewhat complex molded light housing which has been designed to provide front access to the light bulb for replacement. This system requires draining of the tub for bulb replacement, but the front-access design allows for manufacturers to increase the quantity and uniformity of the insulation packed behind the light housing. This is apparently a significant and attractive design feature of this second option.

Both methods result in increased manufacturer expense through replacement and occasional on-site warrantee servicing of the failed system. Such expense is not only for the replacement of the bulb, but also for cost and labor of either emptying the tub and replacing the water and chemicals required, or for removal and careful replacement of insulation encapsulating the bulb housing.

SUMMARY OF THE INVENTION

It is therefore a general object of the present invention to provide an improved underwater lighting assembly.

It is another object of the present invention to provide an effective, competitively priced alternative to incandescent spa lighting.

It is another object of the present invention to provide a spa lighting arrangement that has color variation without requiring additional tinted lenses that easily get misplaced or broken.

In one form, the present invention provides an underwater lighting assembly including a housing and a plurality of LEDs mounted within the housing. The LEDs are arranged in a plurality of banks. The banks are circular and concentric.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENTS

Figure 1:
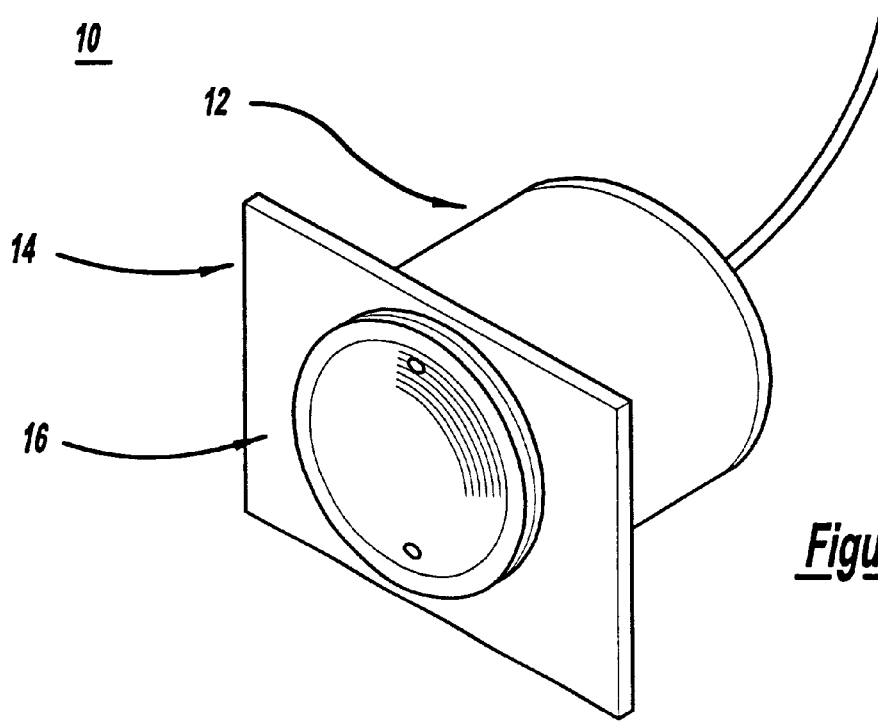
FIG. 1 is a perspective view of an underwater lighting assembly constructed in accordance with the teachings of a first preferred embodiment of the present invention to include a front access housing.
Figure 6:
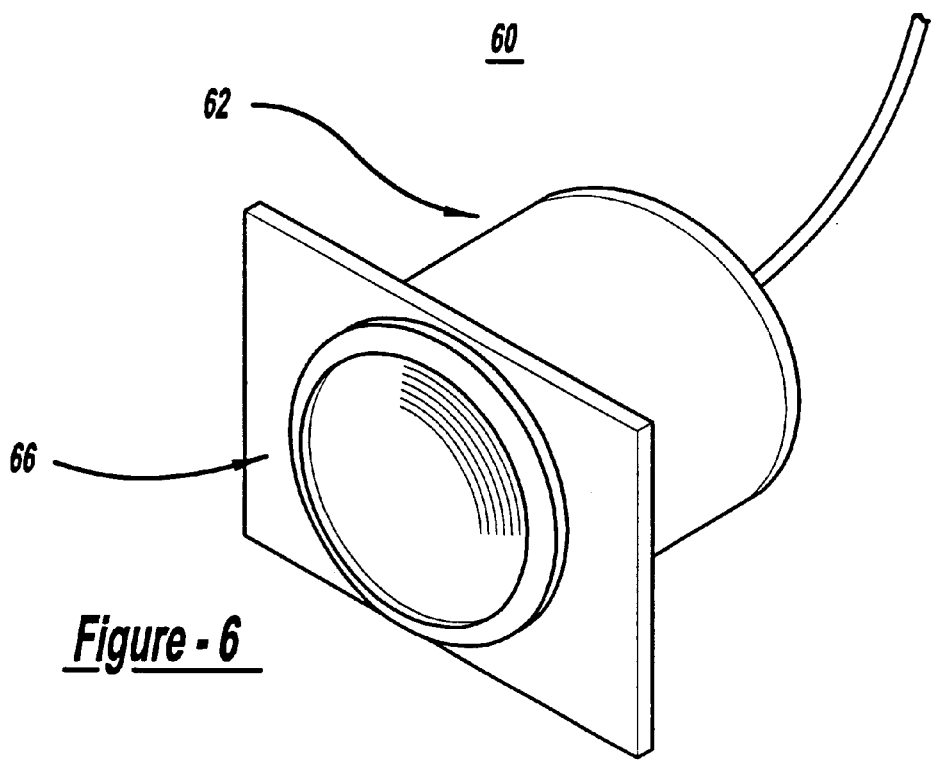
FIG. 6 is a perspective view of an underwater lighting assembly constructed in accordance with the teachings of a second preferred embodiment of the present invention to include a rear access housing.

With initial reference to FIG. 1, an underwater lighting assembly constructed in accordance with the teachings of a preferred embodiment of the present invention is illustrated and generally identified with reference number 10. The lighting assembly 10 of the first preferred embodiment includes a front access housing. A second preferred embodiment of the present invention including a rear access housing is shown in FIG.6 and generally identified with reference numeral 60. It will be understood that the particular embodiments shown are merely exemplary. In this regard, the teachings of the present invention are applicable to a wide range of other underwater lighting assemblies.

Figure 2:
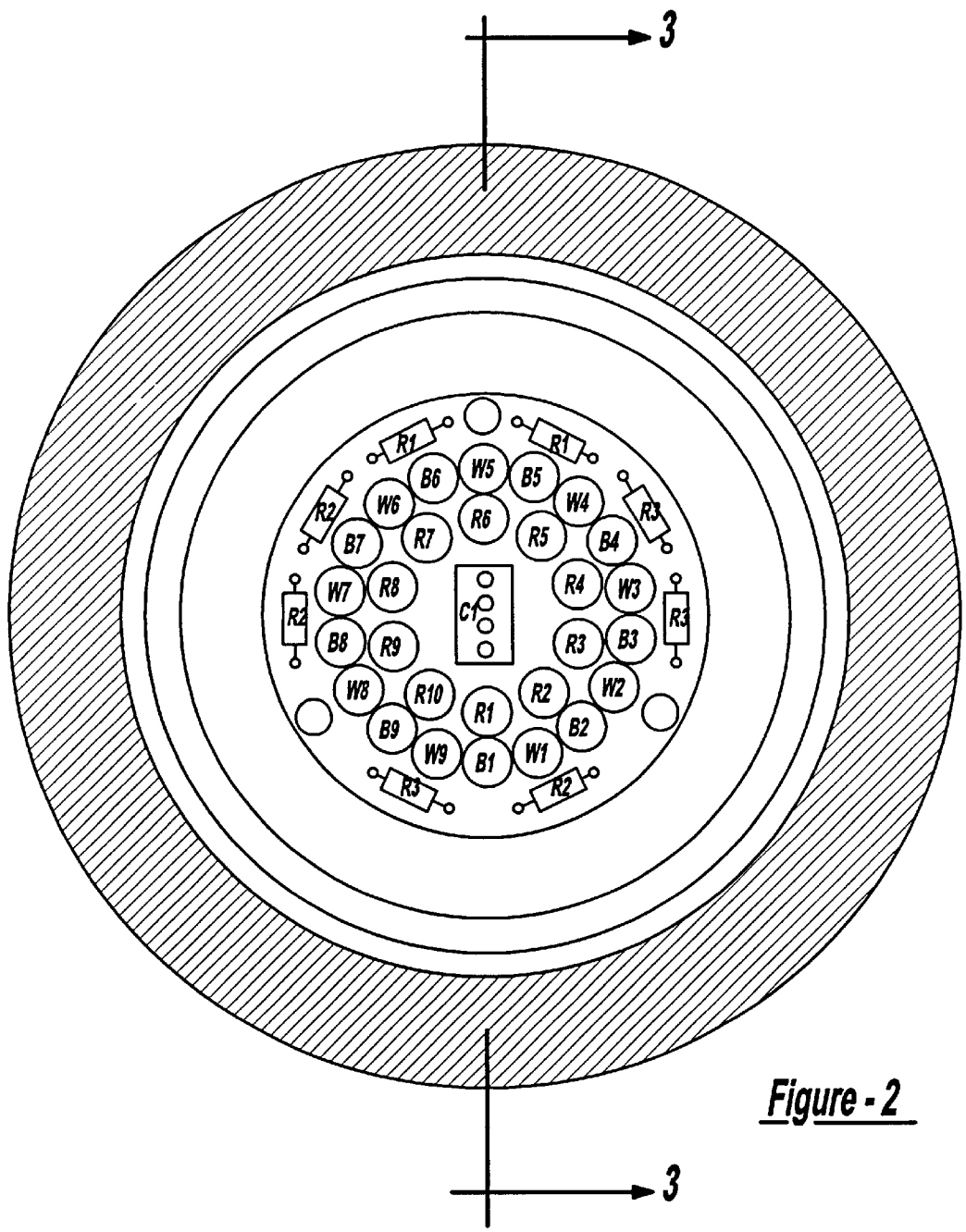
FIG. 2 is a front view of the underwater lighting assembly of FIG. 1.

Turning now to FIGS. 2 through 5, the details of the lighting assembly 10 of the first preferred embodiment will be addressed. FIG. 2 shows an example of the LED array board installed in a front access housing removed from a spa wall. Identifiable through the front diffusing lens of the housing is a representation of the milled round circuit board which is more particularly shown in FIG. 4.

Figure 3:
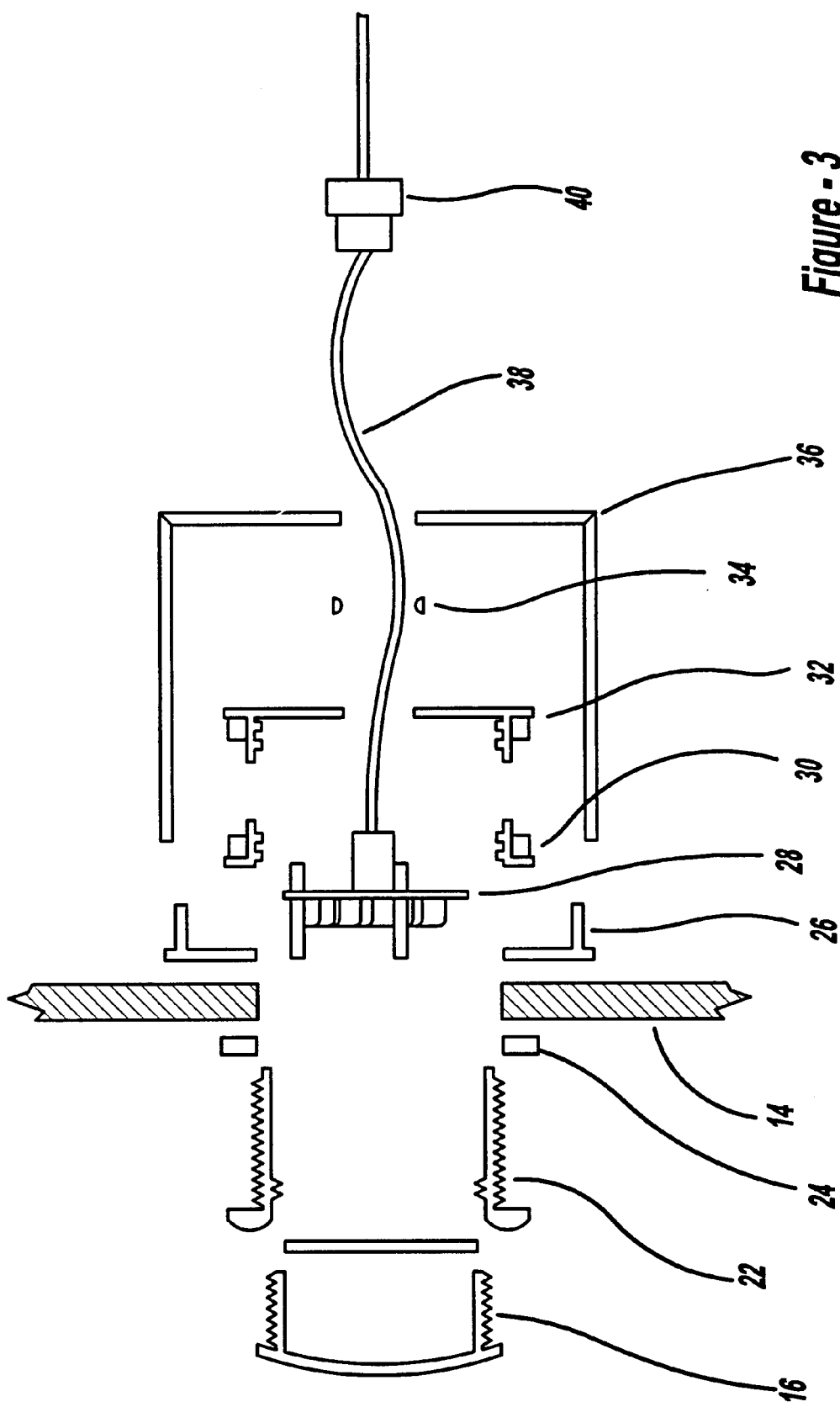
FIG. 3 is a cross-sectional view taken along the line A–B of FIG. 2, shown exploded.
Figure 5:
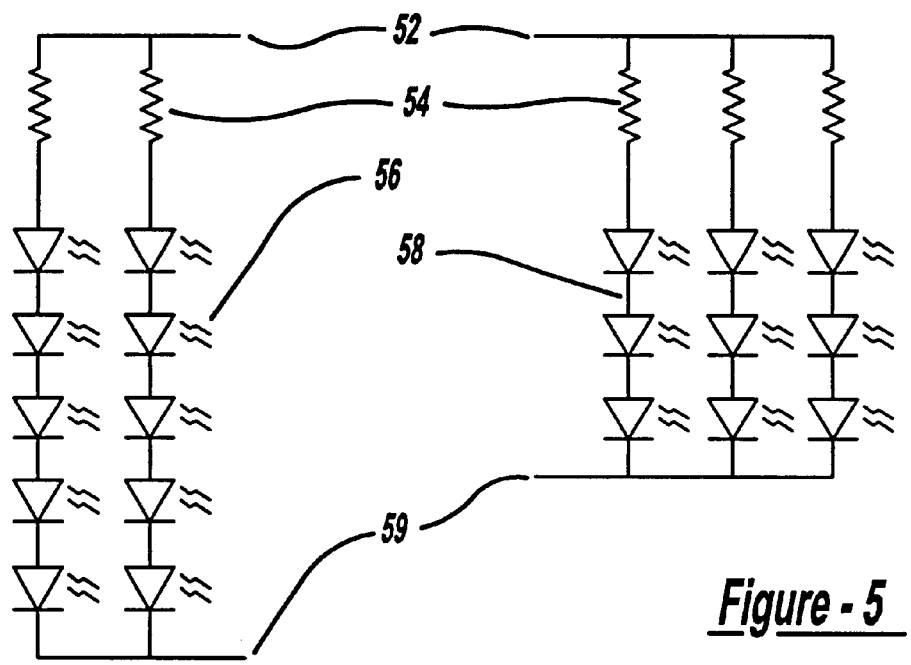
FIG. 5 is a schematic diagram of the electrical circuit of the under water lighting assembly of FIG. 1.

With regard to FIG. 3, the front access board 28 is milled to a size allowing insertion of the board through removal of the front diffusing lens 16. A wiring harness 38 connects the board to the unit power supply through wiring access routing at the rear of the housing. Front access considerations also allow for the retrofitting of the circuit board into a housing previously used for incandescent lighting. In this application a short wiring harness is supplied, along with a sized backing plate. The harness is plugged into the existing electrical mounting structure for the incandescent light. The backing plate 32 provides for a mounting support for the LED board standoffs simulating the backing plate 32 illustrated in FIG. 3.

In a new assembly of FIG. 3, the main lens housing 22 and water sealing gasket 24 are secured against the spa wall section, secured with the retaining nut 30 along with the housing backing plate. The LED board 28 is mounted in the housing against the LED board backing plate 32. The optional secondary diffusing lens is mounted using the LED board standoffs. The removable front diffusing lens 16 with o-ring water seal is screwed into the housing front, slightly compressing the LED board standoffs, thus securing and aligning the LED board. The rear sealed housing 36 is adhered to the rear housing backing plate 26 and the LED boardwiring harness 38 is secured to the rear sealed housing with the conduit connector 40 and connector nut 34 providing the wiring housing with complete strain relief. The rear of the unit can then be sealed with the thermal spa insulation.

Figure 4:
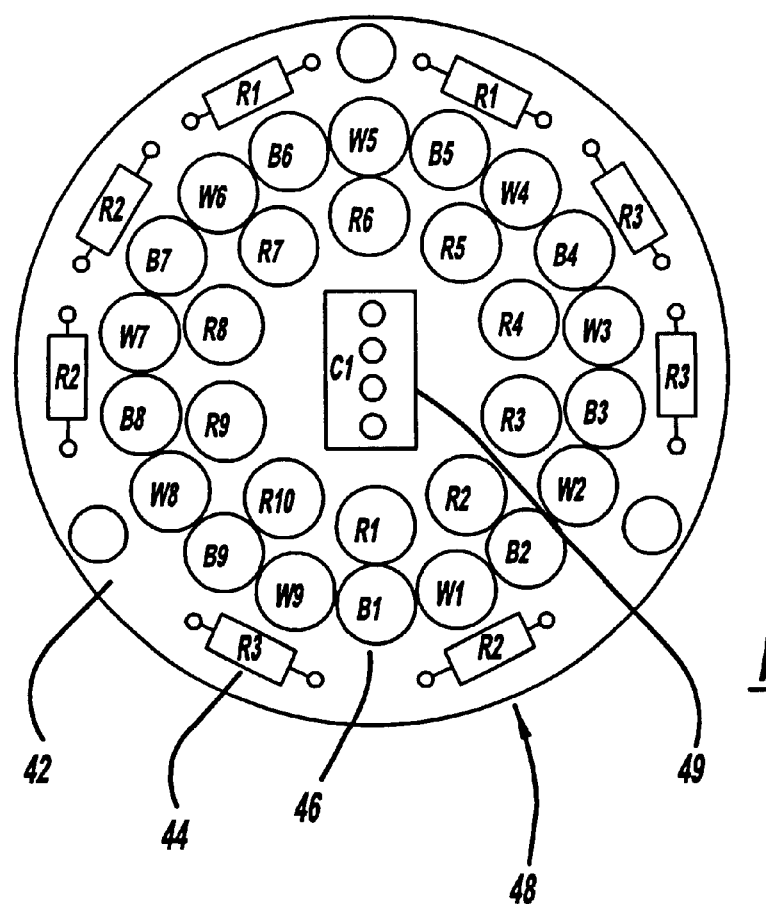
FIG. 4 is an enlarged front view of the circuit board and LED's of the underwater lighting assembly of FIG. 1.

Turning to FIG. 4, the board represented entails three separate LED color banks. In the exemplary embodiment illustrated, the LED color banks are red, blue and white. Each LED bank contains parallel circuits of series LED arrays as in FIG. 5. In this representation, the board is designed for a 12 V DC or 12 V $AC_{rms}$ power supply. Heat produced by LED operation is operationally shown to be effectively dissipated by the large water heat-sink in contact with the front lens.

Each LED array includes a current limiting resistor 54 sized to prevent over-current damage to the LED array and to maximize LED luminosity. Resistor sizing is also determined by the power supply provided. As will be appreciated by those skilled in the art, DC and AC power supplies warrant different resistor values. Individual LED current limitations and the application ambient temperature, derating LED luminosity and performance, a real so factors incorporated in determining the resistor value. Power for each bank of LED arrays is sourced separately through a multi-pin connector allowing remote switching of LED banks 49 in FIG. 4. All banks are linked at a common ground, or neutral, pin 59. Intended application is not limited to the three banks represented here, but can easily be expanded to incorporate a large number of separately colored banks of any number of parallel LED arrays. Luminosity and color expansion is only limited by available circuit board space considerations. Varying the current limiting resistors enables control of a 'pulse' AC current as well as DC.

Figure 9:
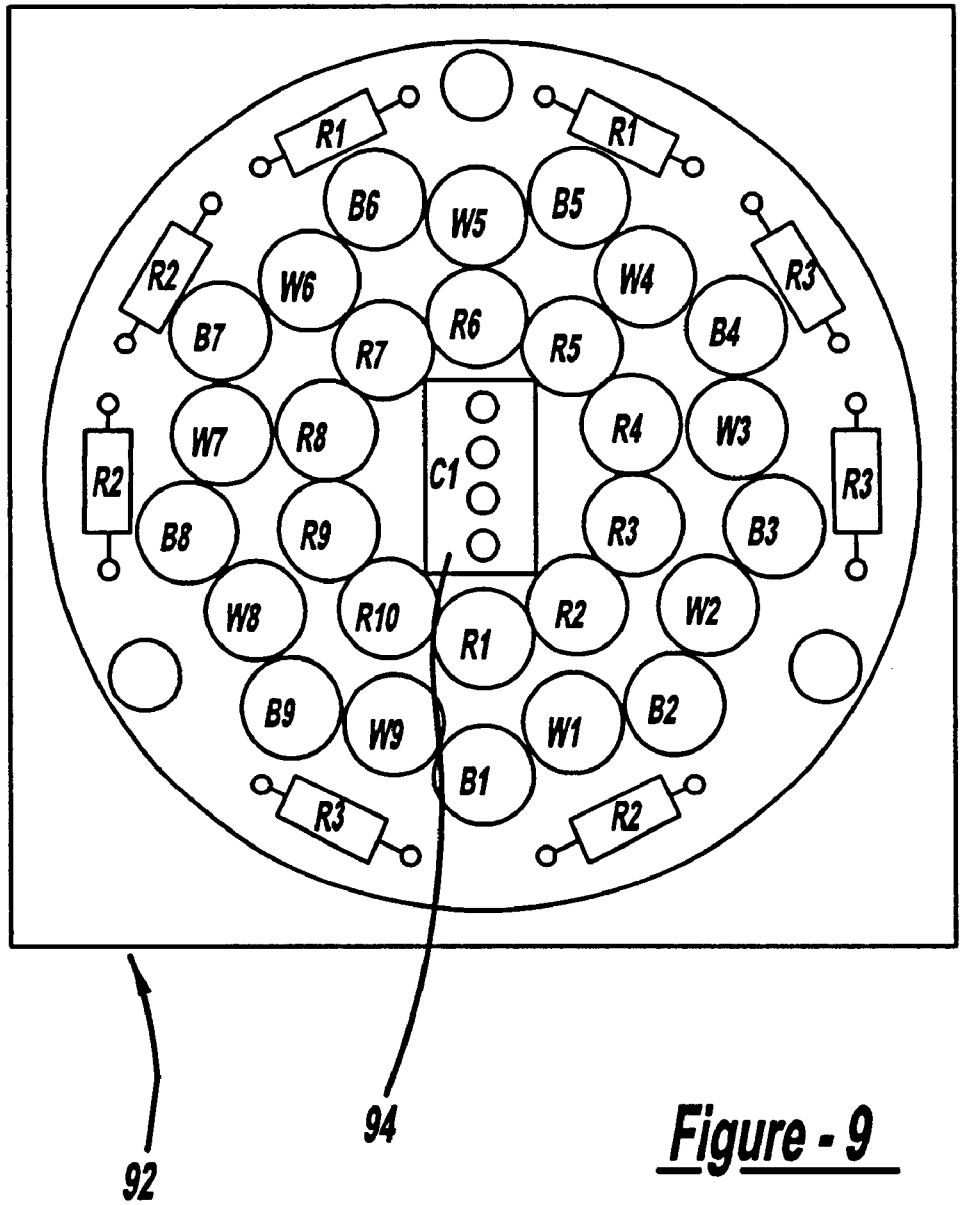
FIG. 9 is an enlarged front view of the circuit board and LED's of the underwater lighting assembly of FIG. 6.

As shown in FIGS. 4 and 9, the LED banks installed are preferably arranged in concentric circular patterns to provide even light distribution and diffusion by the front housing lens. The center section provides a convenient location for a multi-pin connector 49. Available space on the outer sections of the board provides room to install the current limiting resistors 44. Location of the standoffs required to secure and align the board in a front access housing is provided by the three milled circular holes disposed equidistant around the board. All boards 48 are standard doublesided PCBs in 1 or 2 oz tinned Cu, solder-masked and silk-screened.

Turning now to FIGS. 6 through 9, the details of the lighting assembly 60 of the second preferred embodiment will be addressed. The lighting assembly 60 is identical to that referenced as the lighting assembly 10 in construction, intended use and electronic design. The inclusion of this board 92 is intended to identify and imply the various differing applications of the preferred embodiment when applied to differing housings.

Figure 7:
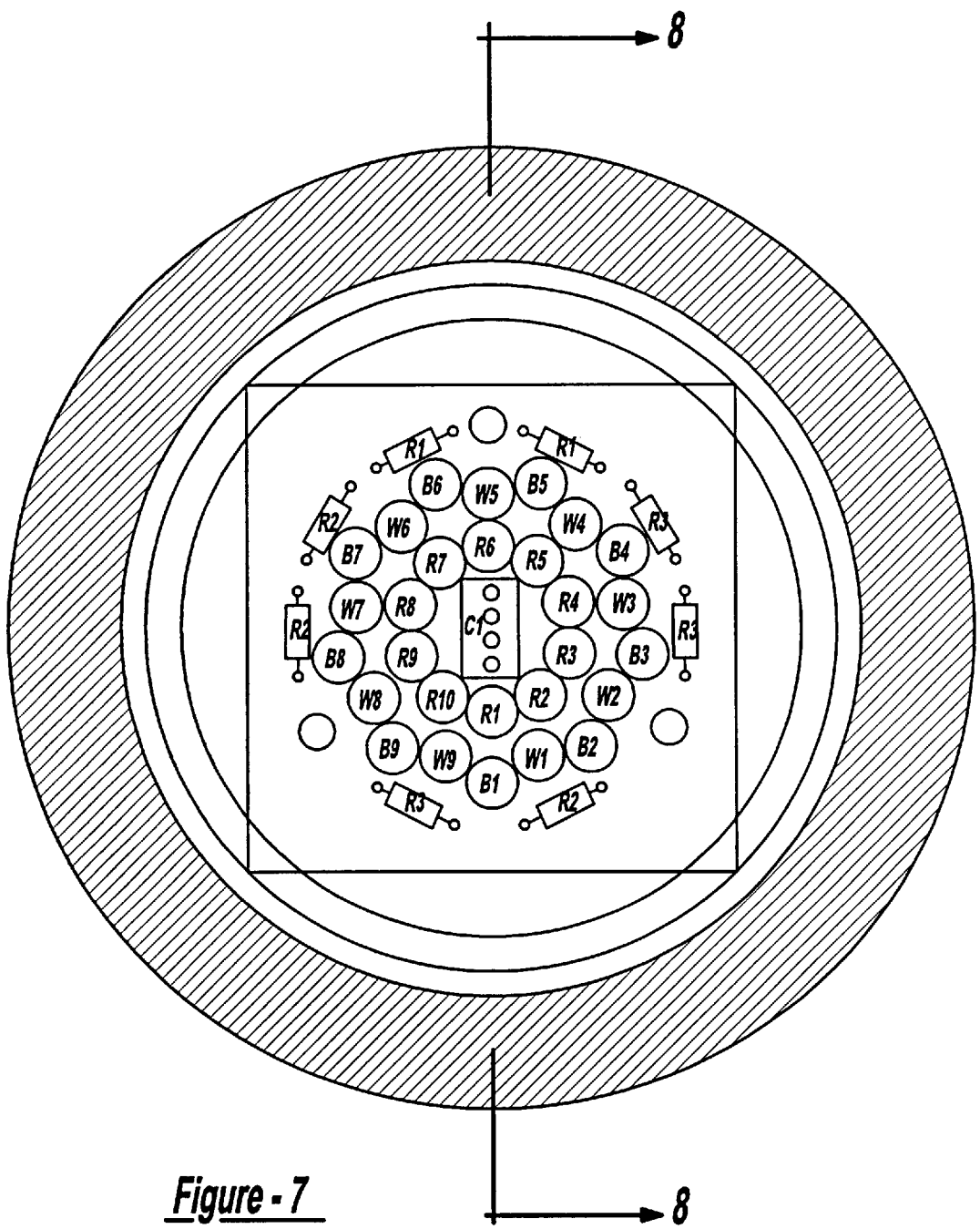
FIG. 7 is a front view of the underwater lighting assembly of FIG.6.
Figure 8:
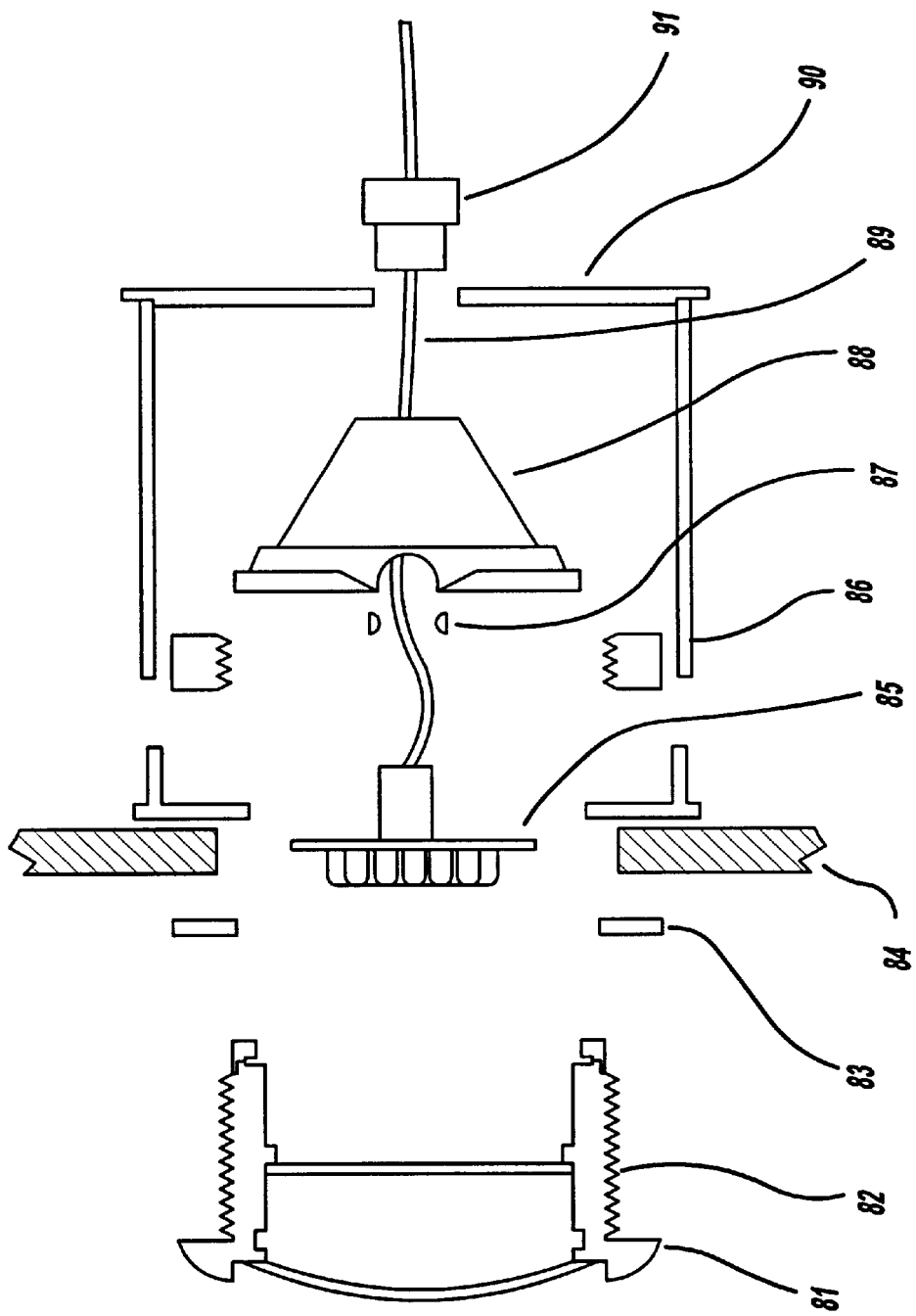
FIG. 8 is a cross-sectional view taken along the line A–B of FIG. 7, shown exploded.

The illustrated board 92 is milled and sized to allow installation in to a rear access housing 90, as illustrated in FIG. 8. The front view of this housing as assembled is represented in FIG. 7. This illustration indicates the placement of the board in the housing. Referring to FIG. 8 it can be seen that the board is intended to be used in a new installation in a housing of less complexity than that referred to in the description of the board to be installed in a front access housing 22 of FIG. 3.

This housing also incorporates an outer housing 90 to isolate the unit from surrounding insulation. Also evident is the required strain relief provided by the conduit connector 91 and nut 87 used to secure the wiring housing to the outer housing, as well as the outer housing backing plate and retaining nut 86.

The inner housing and lens combination is simplified from that of reference 10 in FIG. 3, as is the method of securing and aligning the LED board. A sealed outer lens section 81 incorporating an optional secondary diffusing lens 82 and water sealing gasket 83, is secured by the outer housing retaining nut 86. The board is milled square and sized so that the four corners fit in a small recessed milling in the rear of the front lens section. The rear housing cover 88 is attached to the rear of the lens section through a small rotation pinning the LED board between the rear housing and the front lens section.

Figure 10:
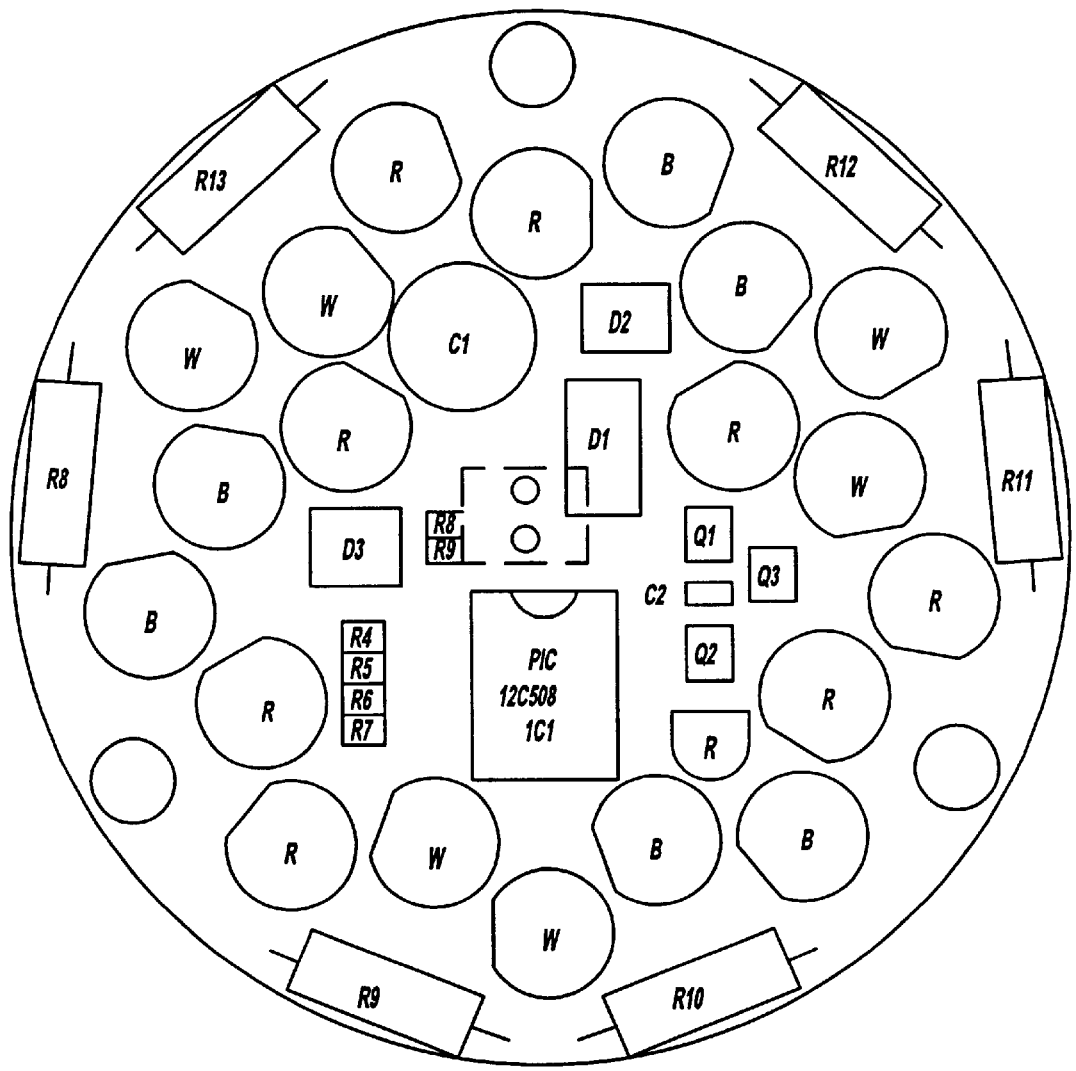
FIG. 10 is a front view of a circuit board and LEDs incorporating a tri-color sequencing feature.
Figure 11:
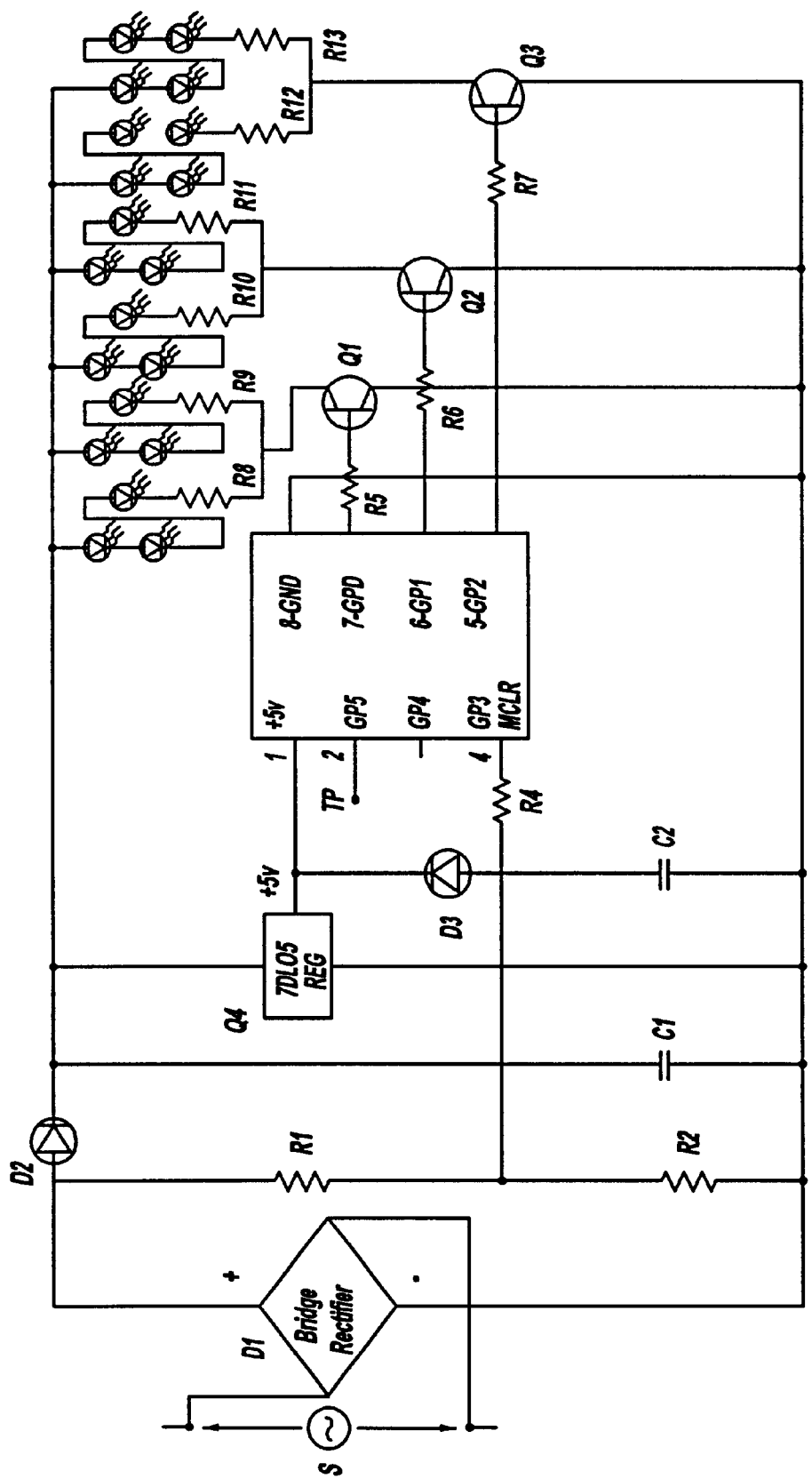
FIG. 11 is a schematic diagram of the arrangement of FIG. 10.

With reference to FIGS. 10 and 11, an LED arrangement is illustrated incorporating a tri-color LED arrays with a sequencing feature. A bridge rectifier D1 and on-board circuitry converts the standard incoming 12 VAC supply to 18 VDC. This allows for the more flexible options for supplying power to the circuitry. In this configuration the board can be powered by either 12 VAC or 18 VDC. An on-board programmable processors allows independent color switching and color modulation of the LED arrays.

The on-board processor can be used to individually, or simultaneously control any of the LED color arrays. Different LED intensities are controlled by the processor by sending a high or low level signal to the base of the switching transistors (Q1–Q3). Using this control signal, the LED scan be switched on and off at a frequency higher then eye can perceive. By varying the duty cycle of the waveform, meaning the amount of time the waveform is high (on), compared to the amount of time it is low (off) from the processor, any intensity of the LED can be achieved, from %0–%100.

Using the switching transistors (Q1–Q3) the low voltage control signal can be separated from the higher voltage LED power side of the circuit. Using a preprogrammed computer algorithm, programmed within the processor, an incremented or decremented duty cycle waveform can be achieved, thus resulting in allowing a smooth fade in led intensity. Since these can be controlled individually, one color can be faded up in intensity, and the others down in intensity, thus giving a consistent amount of light intensity at all times, but of differing color. This is essential to the safety aspect of the lights, as there will be no periods of darkness or bright intensities, just differing colors. Through processor programming differing LED colors and arrays can be operated simultaneously, allowing modulation of installed LED colors and the opportunity to blend installed LED colors in various ways to produce secondary and tertiary spectral colors. With careful process or control, essentially a spectral color emission can be achieved through the mixing of two or three base LED colors.

These color variations can be achieved during the transition period of modulating from one LED color to another, or can be set as permanent mixed colors with an independent mode programmed into the processor. Programming of the processor can simply be changed, or updated at a later time to allow for a different modulation effect, or differing set of mixed colors. Programming can also be added to change the overall intensities of the light output, depending upon the customer preference.

The PCB design allows installation into existing spa and pool lighting assemblies. It is known that the majority of spa and pool lighting systems are powered with 12 VAC. Operating LEDs with AC power reduces the overall luminosity and efficiency available from the LED arrays, requiring additional LEDs to be installed on the PCB to produce the required illumination. If the incoming power is converted to DC, the number of LEDs required for illumination is reduced relative to AC operation. This frees additional space on the board for the addition of control circuitry.

Control circuitry allows the separate LED colors installed to be powered from a simple two wire industry standard 12 VAC power supply with simple on/off switching. This eliminates the required running of multi-conductor wire to control the LED arrays from a multi-position switch. Cycling the on/off switch allows the control circuitry to cycle illumination between the installed LED colors and allows for the addition of a "sequencing" or "modulation" mode in which the various installed colors are cycled randomly at varying intervals with a "fade up" and "fade down" in intensity producing attractive color combinations and intensity effects. Additional modes programmed into the process or can offer illumination in any of an essentially infinite spectrum comprised of the previously mentioned blending of LED colors in varying intensities and combinations.

Separate circuitry for the conversion of incoming 12 VAC conversion to 18 VDC and for the addition of a programmable IC has been added to the LED PCB. The circuitry components allow the IC to retain a time-limited memory during power off cycles of the control switch. In this manner, the IC can remember the last illumination color and switch to the next programmed color or mode at the re-instatement of power. If the supplied power remains off for an extended period of time, the IC loses memory and reverts to its default programming for the next power application.

The on-board circuitry contains a capacitor which is charged by the incoming AC power signal through a series diode. This allows for detection of the lack of AC power at a point prior to the series diode, and allows the capacitor to remain charged without allowing its power back through the diode and into the power source. A simple voltage divider circuit allows the processor to monitor the incoming power line, and as it drops out, the process or can turn off all the LEDs and maintain its own processor power through the charged capacitor. If power is returned prior to the capacitor being fully discharged, then the processor will advance to the next mode in its list of sequences. If power is not returned before the capacitor is discharged then the processor simply resets to its default mode upon power being applied once again.

The IC is programmed to operate in a "sequencing" or "modulation" mode. One example of possible IC programming is as follows; when activated, the IC flashes through all available LED colors to indicate it is in "modulation" mode. The IC then chooses an available LED color at random and ramps its intensity from 0% to 100% over a predetermined period. The selected color then remains at 100% intensity for a random period of time, up to 20 seconds. Once this time period has expired, the IC then chooses randomly from the remaining available LED colors and ramps up the new chosen color while simultaneously ramping down the intensity of the previous color. It then runs through the cycle again, leaving the chosen color at 100% intensity for a random period of time, choosing a new color at random and fading into the new color after the time period has expired. This intensity variation can also be programmed to incorporate any or all various colored LED arrays simultaneously.

These color combinations and modulation sequences serve to create a complete smooth random color variation in spa and pool illumination and serves an example of the utility and versatility of the adaptation of LED arrays into underwater spa and pool lighting.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An underwater lighting assembly comprising:
    a waterproof housing for underwater submersion;
    a round front access LED board disposed within a waterproof chamber of the housing;
    a plurality of LEDs and a programmable controller mounted on said board within the housing, the LEDs arranged in a plurality of banks; and
    a power supply that powers the controller and the LEDs, the controller configured to control the LEDs in response to switching of the power supply between on and off states.

2. The underwater lighting assembly of claim 1, wherein the LEDS of each bank of the plurality of banks is independently controllable to adjust intensity and corresponds to a different color.

3. The underwater lighting assembly of claim 1, wherein the plurality of banks include three banks.

4. The underwater lighting assembly of claim 1, further comprising a shunt capacitor charged by the power supply and that powers the controller while the power supply is switched off.

5. The underwater lighting assembly of claim 1, wherein the housing is mountable on a dry side of a pool wall, and further comprising a removable diffusing lamp having a front surface disposable on a water side of the pool wall, the diffusing lamp including a portion for extending through a hole in the pool wall and removably engaging the housing.

6. The underwater lighting assembly of claim 5, wherein the LED board is sized to pass the hole in the pool wall.

7. A control system for controlling a plurality of LEDs installed on a board in a housing of an underwater lighting assembly, comprising:
    a power supply;
    a non-board programmable controller for generating, in response to switching of the power supply between on and off states, operating signals for a predefined portion of a timing cycle; and a plurality of switching transistors, the switching transistors interposed between the plurality of LEDs and said controller;

wherein said plurality of LEDs are arranged on said board in a plurality of banks and powered by the power supply, each of the banks having a group of LEDs being allocated for a different color;

the controller is operative to simultaneously fade at least a first color up in intensity and a second color down in intensity to continuously provide a constant light intensity of varying colors;

the controller is further operative, when an off state of the power supply is sensed, to provide at least a third color upon a switching on of the power supply.

8. The control system of claim 7, wherein the housing is installed in a wall of a pool and provides access to the board from a dry side of the wall.

9. A control system for controlling a plurality of LEDs installed on a board in a housing of an underwater lighting assembly, comprising:

a power supply that cycles between on and off states;

a non-board programmable controller for generating operating signals for a predefined portion of a timing cycle; and a plurality of switching transistors, the switching transistors interposed between the plurality of LEDs and said controller;

wherein said plurality of LEDs are powered by the power supply and are arranged on said board in three banks, each of the banks having a plurality of LEDs being allocated for a different color;

wherein the controller is programmed to switch the transistors in response to the cycling of the power supply.

10. The control system of claim 9, wherein the predefined portion represents the duty cycle of a PWM signal and the timing cycle is the PWM period.

11. The control system of claim 9, further comprising as hunt capacitor that supplies a power to the controller such that the controller advances to a next mode in sequence.

12. The control system of claim 9, further comprising a non-board rectifier unit to convert AC power to DC power and wherein the plurality of LEDs are powered from a two-wire transmission with on/off switching.

13. The control system of claim 12, further comprising a voltage divider circuit unit having a shunt capacitor charged by the power supply through a series diode, the unit allowing the controller to monitor the incoming power, the controller operative for turning off all the plurality of LEDs in response to a power failure.

14. The control system of claim 12, wherein the controller further comprising a color switching mode, said color switching mode being used to switch from one of the first, second and third color banks to another of the first, second and third color banks by switching on a transistor connected to the one color bank and simultaneously switching off a transistor associated with both of the other color banks.

15. The control system of claim 14, wherein the controller further comprising a color modulation mode wherein color modulation is automatically implemented by switching on all of the transistors and ramping intensity of each said plurality of LEDs in each bank.

16. A method for controlling colors emitted from an underwater lighting assembly, said underwater lighting assembly having a housing and a plurality of LEDs mounted on a board within the housing arranged in first, second and third banks, said first, second and third banks operative to emit first, second and third colors, respectively, the method comprising the steps of:

cycling a power supply to the LEDs between on and off states to generate a sequencing signal;

selecting the first color by turning on a first switching transistor connected to the first bank of color;

simultaneously turning off a transistor connected to the second bank and a third transistor associated with the third bank;

after a first predetermined time, selecting the second color by turning on the second transistor, turning off the first transistor and keeping a third transistor off for the predetermined time;

after a second predetermined time, selecting the third color by turning off the second transistor, keeping the first transistor off and turning on the third transistor; and maintaining an overall light intensity of the underwater lighting assembly by simultaneously fading the intensity of at least the first color up and the intensity of at least the second color down;

wherein the selecting steps are performed by a controller in response to the sequencing signal.

17. The method of claim 16 further comprising the steps of:

confirming a modulation mode and flashing the first, second and third colors by switching on and off all switching transistors at random;

selecting a first specific color of the first, second and third colors at random and ramping its intensity for a first predetermined period and maintaining its intensity for a second predetermined period of time; and selecting randomly a second specific color and ramping up the second specific while simultaneously ramping down the intensity of the first specific color.

18. The method of claim 17, further comprising the step of leaving the first specific color in full intensity for a random period of time, selecting a third specific color at random and fading into the third specific color after the predetermined period of time has expired.

19. The method of claim 16, further comprising the sequencing signal providing power to the controller.

20. The method of claim 19, further comprising a shunt capacitor providing power to the controller while the power supply is in the off state.

* * * * *